Aug. 9, 1966        J. GALLO, SR        3,265,104
TUBULAR SAW CUTTER WITH CHIP REMOVAL MEANS
Filed Feb. 24, 1964
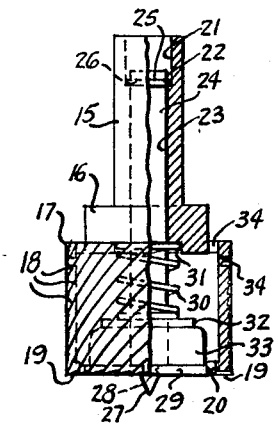
FIG.1
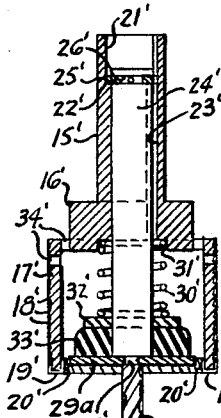
FIG.3
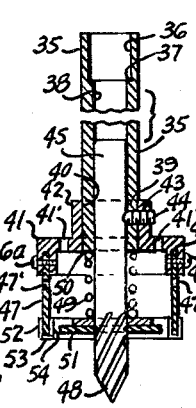
FIG.5
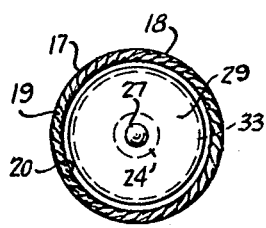
FIG.2
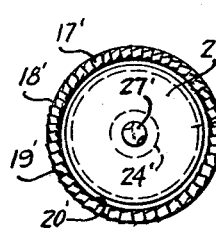
FIG.4
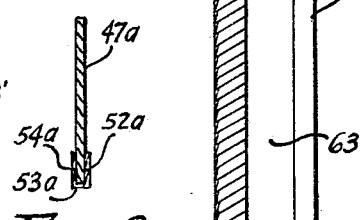
FIG.6
FIG.7
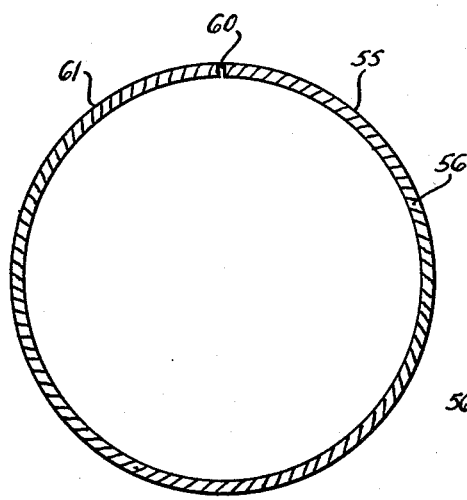
FIG.8
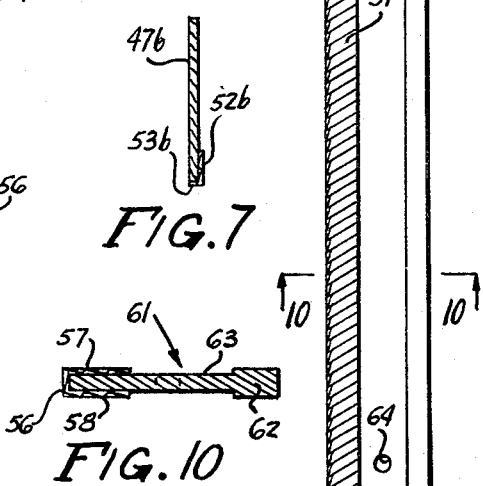
FIG.9
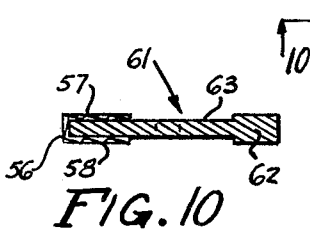
FIG.10
INVENTOR.
JOHN GALLO, SR.
BY Kimmel & Crowell
ATTORNEYS.

United States Patent Office 3,265,104
Patented August 9, 1966

3,265,104
TUBULAR SAW CUTTER WITH CHIP
REMOVAL MEANS
John Gallo, Sr., 64 Broad St., Boston, Mass. 02109
Filed Feb. 24, 1964, Ser. No. 346,808
8 Claims. (Cl. 145—130)

This invention relates to saw cutters, band saws, hack saws, saber saws and the like, and more particularly to a method of making a multipurpose saw tooth means in various forms which may be easily adapted for use on conventional hand or machine drill presses, circular core saw cutters, circular design cutters, band saws, saber saw blades and similar saw means which may be made either as an individual saw tool or packaged as a multipurpose saw kit and the like.

In working with various soft metals, plastics, wood and the like, it is found that the conventional saw tooth does not have sufficient clearance and chip removal means when working to closely measured tolerances to prevent "clogging up" of the saw teeth with saw chips which results in the saw means becoming ineffective in operation and in removing the cut-away material from a work piece.

This invention solves the above problems by providing a multipurpose saw tooth means comprising tooth chip clearance and chip material removal means therefor.

A primary object of this invention is to provide a multipurpose saw cutter having clearance means and chip removal means therefor.

A further object of this invention is to provide a method of making a universal purpose saw of the character described which will make a cut at a very rapid rate of speed with a minimum expenditure of power provided by a clearance and chip removal means thereon.

Another object of this invention is to provide a universal saw means and reinforced structural support means therefor which is adapted to be used as a saber or back saw means on various types of work materials.

Yet another object of the invention is to provide a multipurpose saw means and reinforced structure therefor which may be used either as a hollow core saw or design saw in various types of work materials, such as metal, wood, plastics, and the like.

A further object of this invention is to provide a universal hollow core saw means having spring bias rejection means to automatically expel a severed center core of work material therefrom.

Yet a further object of this invention is to provide a hollow core saw means and support structure therefor having saw teeth on more than one circumferential surface thereof.

Another object of the invention is to provide a hollow core saw cutter adapted to be mounted on various types of support mandrels therefor.

Yet a further object of this invention is to provide a saw and structural means having cutting means on at least three surfaces thereon with helical chip removal means therefor.

Another object of the invention is to provide a method of making sawing teeth on the end and inside and outside walls of a metal tube of material by right hand and left hand knurling opposite walls of the tube and matching the teeth on the outer end of the tube of material cutting the band of saw material and developing same into a straight length of saw material, forming and hardening same into a hack saw blade, saber saw blade, band saw material or the like.

The above and still further objects, features, and advantages of the present invention will become apparent upon consideration of the following detailed description of the various embodiments thereof, especially when taken in conjunction with the accompanying drawings, wherein:

FIGURE 1 is a part sectional elevational view of a first embodiment of this invention in which the hollow core guide means is a center punch means therefor surrounded by a spring biased automatic core material rejection means;

FIGURE 2 is a bottom plan view of FIGURE 1 showing a spiral inclination of the cutting teeth thereon;

FIGURE 3 is a sectional elevational view of a second embodiment of this invention similar to FIGURE 1, except the guiding means of this embodiment comprises a twist drill or similar means therefor;

FIGURE 4 is a bottom plan view of FIGURE 3 showing a straight radial inclination of the cutting teeth thereon;

FIGURE 5 is a sectional elevational view of a third embodiment of this invention comprising a rotary saw holder in which the center guiding means is a wood drill bit or the like surrounded by a spring biased automatic core material rejection means which has cutting teeth on at least three surfaces of the structural core cutter of a desired inclination thereon;

FIGURE 6 is a part section elevational view of a side portion of a core cutter, hack saw blade, saber saw or the like having cutting edges on at least three surfaces of the supporting structural support means;

FIGURE 7 is a part sectional elevational view of a side portion of a saw means in which cutting teeth are mounted on a vertical side portion and a bottom edge thereof;

FIGURE 8 is a circular development of a band saw or hollow core cutter means in which one side surface and the bottom edge surface of the saw means comprise helical saw teeth thereon;

FIGURE 9 is a developed view of a hack saw or saber saw blade having side helical chip removal and cutting means and saw teeth means on the bottom edges thereof structurally supported by a central web means and a back reinforced ridge or back bone; and FIGURE 10 is an enlarged sectional view of FIGURE 9 taken substantially on lines 10—10 in the direction of the arrows.

Like reference numerals designate corresponding parts in the figures of the drawing.

FIGURES 1 and 2 illustrate an exemplary embodiment of the invention in which the saw means is comprised of a shank portion 15 integrally formed with a shoulder portion 16 integrally connected to a hollow core cutter means 17 having helical teeth 18 on the outer side walls thereof, helical cutter teeth 19 on the bottom edge thereof, and helical teeth 20 on the inner peripheral side wall thereof.

Shank portion 15 has a concentric aperture 21 therein communicating with a concentrically apertured shoulder means 22 and smaller concentric aperture means 23 adapted to reciprocably receive a center punch or pilot shaft 24 secured therein by a spring ring 25 and groove means 26 in shaft 24 terminating at lower pointed end 27 and groove retaining means 28 adapted to fixedly receive automatic work material expulsion means 29 formed thereon to fixedly secure spring bias means 30 against inner apertured shoulder means 31 of external shoulder means 16 and apertured washer means 32 bearing against flexible support member 33, formed of rubber or the like. Vents 34 may be provided in the side and top of the hollow core cutter means 17 as desired.

FIGURES 3 and 4 show another embodiment of the invention in which the saw means is comprised of a shank portion 15' integrally formed with a shoulder portion 16' integrally connected to a hollow core cutter means 17' having helical teeth 18' on the outer side walls, radial teeth 19' formed on the bottom edge and helical teeth 20' on the inner peripheral side wall thereof. Vents 34' are provided in the hollow core cutter means 17'.

Shank portion 15' has a concentric aperture 21' therein communicating with a concentrically apertured shoulder means 22' and smaller concentric aperture means 23' adapted to reciprocably receive a drill bit or pilot shaft 24' secured therein by a spring ring means 25' and groove means 26' in shaft means 24' terminating at the lower pointed end 27' in a twist drill means and groove retaining means 28' adapted to fixedly receive automatic rejection work material double disc expulsion means 29a formed thereon to fixedly secure spring bias means 30' against inner apertured shoulder means 31' of external shoulder means 16' and centrally apertured washer means 32' against flexible support member 33', as shown.

FIGURES 5 and 6 illustrate another embodiment of the invention in which the saw means is comprised of shank means 35 having a concentric aperture 36 therein communicating with a concentrically apertured shoulder means 37 and smaller concentric aperture means 38 having a lower side wall aperture means 39. Shank means 35 communicates with concentric aperture means 40 of saw holder means 41 having vents 41' and including neck portion 42 adapted by screw aperture means 43 to receive retaining screw means 44 to comate with aperture means 39 of shank means 35 and fixedly secure therein pilot shaft means or bit means 45.

The lower end of the saw holder means 41 terminates in an arcuate slot means 46 having screw retaining means 46a therein to fixedly secure saw means 47 having vents 47'.

Pilot shaft means 45 terminates in a pointed helical fluted end means 48 adapted to penetrate a work piece (not shown). Spring bias means 49 bears against the lower end 50 of shank means 35 and double disc work material rejection means 51.

Saw means 47 has outer wall teeth means 52, lower end teeth means 53, and inner wall saw tooth means 54, all of a desired form.

FIGURE 6 illustrates a three-surface teeth means such as in the embodiment of FIGURE 5 having outer peripheral teeth 52a on wall portion 47a, end teeth 53a and inner peripheral teeth 54a.

FIGURE 7 is a modified form of saw means 47a in FIGURE 6 in which saw means 47a is comprised of outer side wall teeth means 52b and lower end saw teeth means 53b only.

FIGURES 8, 9, and 10 show a circular method of development of a band saw blade means, hack saw blade means, core saw cutter means 55 and the like having helical teeth 56 thereon formed from a conventional tubing material comprising the following method steps: forming helical teeth 57 on one side wall of the tube material with a right knurling tool or the like, forming helical tooth 58 on the opposite side walls of the tube material with a left hand knurling tool and forming teeth 56 of a desired shape on the end of the tubing material. The tube is then severed at 60 of FIGURE 8 and straightened or formed into a desired length of saw material 61 as seen in FIG. 9. The back bone means 62 and intermediate web means 63 are then formed on the saw blade 61 in any conventional manner, it being understood that the shoulder forming the backbone 62 could be formed before the cutting of the tube at 60. Aperture means 64 are punched or formed in any desirable manner in saw means 61, after which saw means 61 is placed in a furnace to be heated, annealed or treated in a desired manner and tempered to insure a desired flexibility of saw means 61, after which the teeth means 56, 57, and 58 of FIGURE 10 are specially heat treated and tempered to a desired hardness, usually corresponding to a substantially greater hardness than the work material against which the saw means 61 is used.

Aperture means 64 of saw means 61 are adapted to fixedly receive the conventional pin securing means of a hack saw frame means (not shown).

*Operation*

The shank means of the saw cutter of FIGURES 1, 2, 3, 4, and 5 may be placed in a chuck means of a portable drill or drill press to contact a work material for the purposes of cutting a core of material therefrom or cutting a circular design in the work material.

The saw means shown in FIGURES 9 and 10 is adapted to be used either as a band saw belt means or hack saw blade on a hack saw frame means as understood by those skilled in the art.

In the use of the saw cutter of FIGURE 1, the work material is first pierced by a center punch or like tool and then pointed means 27 is positioned in the punched aperture of the work material as a guiding means and pressure of saw cutter means 17 is applied against the work material (not shown) to cut a core of work material therefrom or to cut a circular design in the work material.

In use of the saw cutter of FIGURES 3 and 5 pointed drill end means 27' and helical fluted end means 48, respectively, are self penetrating in a piece of work material preparatory as a guiding cutting means when the saw teeth of these figures are applied to a piece of work material to cut a core of material therefrom or cut a circular design in the work material, as understood by those skilled in the art.

After the saw cutter cuts a hole in a piece of work material, the severed core material is automatically rejected by the spring biased rejection means of FIGURES 1, 3, and 5.

From the foregoing it will now be seen that there is herein provided an improved multipurpose saw cutter and method of making various types of saw teeth thereon which accomplishes all the objects of this invention, and others, including many advantages of greater practical utility and commercial importance.

It is to be understood, of course, that the foregoing disclosure relates to preferred embodiments of the invention as illustrated, that various modifications and changes may be made in the invention by those skilled in the art without departing from the spirit and scope of the invention as set forth in the appended claims.

I claim:

1. A saw comprising in combination an elongated shank means having a concentric aperture therethrough, means concentrically securing a substantially tubular body to said shank means, said tubular body comprising an interior wall, an exterior wall, an exposed annular edge, and cutting teeth forming cutting edges on said interior wall, said exterior wall and said annular edge, said teeth on said interior wall being inclined and closely spaced to define channels facilitating removal of chip material therefrom to prevent clogging of said saw means.

2. The structure of 1 wherein said saw includes a mandrel means fixedly secured in said aperture of said shank means and extending concentrically at least partially into said tubular body, said mandrel means reciprocably carrying adjacent the end thereof a material rejection means comprising a disc extending adjacent said interior wall and having a concentric aperture therein, said mandrel means disposed in said aperture, and spring means surrounding said mandrel means and engaging said material rejection means for forcing said material rejection means along said mandrel means.

3. The structure of claim 1 wherein said mandrel means extends concentrically through said tubular body and provides a fluted portion extending beyond said annular edge.

4. The structure of claim 1 wherein said means concentrically securing said shank means to said tubular body comprises a neck portion surrounding the lower end of said shank means having a transversely positioned screw means extending therethrough, an annular disc secured to the lower end of said neck portion and having a downwardly extending ring fixed about the outer periphery thereof, said annular disc having a unrestricted apertures therein for the free passage of chips from the interior of said tubular body, said downwardly extending ring having slot means therein receiving said tubular body portion.

5. The structure of claim 1 wherein said inclined teeth are helically inclined.

6. The structure of claim 5 wherein said teeth on said interior wall extend substantially the full height of said interior wall.

7. The structure of claim 6 wherein said teeth on said exterior wall are helically inclined and extend substantially the full height of said exterior wall.

8. The structure of claim 7 wherein said teeth on said exterior wall and said teeth on said interior wall are helically inclined in opposite directions.

References Cited by the Examiner

UNITED STATES PATENTS

| | | | |
|---|---|---|---|
| 475,559 | 5/1892 | Heydenreich | 145—120 |
| 655,059 | 7/1900 | Caruthers. | |
| 1,365,660 | 1/1921 | Collier | 145—120 |
| 1,690,803 | 11/1928 | Vander Wee. | |
| 2,064,407 | 12/1936 | Bird | 76—112 |
| 2,349,400 | 5/1944 | Beckwith. | |
| 2,473,077 | 6/1949 | Starbuck | 145—120 |
| 2,524,570 | 10/1950 | Phipps | 175—403 |
| 2,686,439 | 8/1954 | Tobert | 76—112 |
| 2,969,122 | 1/1961 | Steffes | 175—403 X |

FOREIGN PATENTS

| | | |
|---|---|---|
| 1,868 | 1858 | Great Britain. |
| 19,443 | 9/1901 | Great Britain. |
| 104,800 | 3/1917 | Great Britain. |
| 242,676 | 11/1946 | Switzerland. |

WILLIAM FELDMAN, *Primary Examiner.*

MILTON S. MEHR, *Examiner.*

R. V. PARKER, Jr., *Assistant Examiner.*